(12) United States Patent
Goto et al.

(10) Patent No.: US 10,081,341 B2
(45) Date of Patent: Sep. 25, 2018

(54) AUTOMATIC BRAKE DEVICE (71) Applicant: MAZDA MOTOR CORPORATION, Hiroshima (JP)

(72) Inventors: Takashi Goto, Higashihiroshima (JP); Takashi Osaki, Hiroshima (JP); Hirohito Yasumatsu, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/311,736

(22) PCT Filed: Jun. 2, 2015

(86) PCT No.: PCT/JP2015/002795
§ 371 (c)(1),
(2) Date: Nov. 16, 2016

(87) PCT Pub. No.: WO2015/194110
PCT Pub. Date: Dec. 23, 2015

(65) Prior Publication Data
US 2017/0080907 A1 Mar. 23, 2017

(30) Foreign Application Priority Data
Jun. 17, 2014 (JP) .................................. 2014-124514

(51) Int. Cl.
*B60T 7/22* (2006.01)
*B60T 13/14* (2006.01)
(Continued)

(52) U.S. Cl.
CPC .............. *B60T 7/22* (2013.01); *B60T 13/146* (2013.01); *B60T 13/662* (2013.01); *B60T 13/686* (2013.01); *B60T 2201/022* (2013.01)

(58) Field of Classification Search
CPC ........ B60T 7/12; B60T 13/146; B60T 13/662; B60T 13/686; B60T 2201/022
(Continued)

(56) References Cited

U.S. PATENT DOCUMENTS 3,661,459 A * 5/1972 Aoki ..................... G01S 17/107
356/5.03
4,016,566 A * 4/1977 Fujiki ..................... G01S 13/18
342/109
(Continued)

FOREIGN PATENT DOCUMENTS

CN 102161315 A 8/2011
CN 102317133 A 1/2012
(Continued)

OTHER PUBLICATIONS

Temperature measurement system for train rheostat; Michele Norgia; Alessandro Pesatori; Angelo Colombo; 2013 IEEE International Instrumentation and Measurement Technology Conference (I2MTC);Year: 2013;pp. 484-487, DOI: 10.1109/I2MTC.2013. 6555465.*
(Continued)

*Primary Examiner* — Cuong H Nguyen
(74) *Attorney, Agent, or Firm* — Studebaker & Brackett PC (57) ABSTRACT

A brake device includes: a battery connected to a power supply line; a fluid pressure unit driven by power from the supply line and applies fluid pressure to a brake; an alternator that receives power from a vehicle engine and generates power at a voltage higher than a charged voltage of the battery; a capacitor that stores the power generated by the alternator; and a DC/DC converter that converts the voltage of the capacitor to a predetermined value and supplies the converted voltage to the supply line. When the vehicle will potentially collide with a forward obstacle, an output of the
(Continued)

DC/DC converter is set at a target higher than an output voltage in a normal state before brake actuation, or if output of the DC/DC converter cannot be set at the target voltage, the alternator is driven to connect a generation voltage of the alternator to the supply line.

4 Claims, 5 Drawing Sheets

(51) Int. Cl.
*B60T 13/66* (2006.01)
*B60T 13/68* (2006.01)

(58) Field of Classification Search
USPC ............... 701/70; 318/364, 366, 3; 348/372; 342/455, 71, 173; 180/169
See application file for complete search history.

(56) References Cited

U.S. PATENT DOCUMENTS

| | | | | |
|---|---|---|---|---|
| 4,048,613 | A * | 9/1977 | Ito | G01S 13/931 180/169 |
| 4,363,999 | A * | 12/1982 | Preikschat | B60L 11/1805 318/139 |
| 4,673,937 | A * | 6/1987 | Davis | G01S 13/931 342/128 |
| 6,421,600 | B1 * | 7/2002 | Ross | B60L 5/005 180/167 |
| 6,600,415 | B1 * | 7/2003 | Li | G01P 15/135 340/463 |
| 6,879,889 | B2 * | 4/2005 | Ross | B60L 5/005 180/167 |
| 8,599,307 | B2 * | 12/2013 | Solhusvik | H04N 5/3698 348/294 |
| 8,886,433 | B2 * | 11/2014 | Konishi | B60T 8/885 318/362 |
| 9,442,184 | B2 * | 9/2016 | Gehrels | G01S 7/40 |
| 9,614,465 | B2 * | 4/2017 | Shriver | H02P 3/14 |
| 2002/0117340 | A1 * | 8/2002 | Stettner | B60G 17/019 180/169 |
| 2005/0178632 | A1 * | 8/2005 | Ross | B60L 5/005 191/10 |
| 2008/0097675 | A1 * | 4/2008 | Konishi | B60T 8/885 701/75 |
| 2011/0198920 | A1 | 8/2011 | Komuro et al. | |
| 2011/0316329 | A1 | 12/2011 | Nishino et al. | |
| 2013/0127413 | A1 | 5/2013 | Ohtomo | |
| 2014/0152201 | A1 * | 6/2014 | Shriver | B64C 13/50 318/376 |
| 2015/0046054 | A1 * | 2/2015 | Takahashi | B60T 7/22 701/70 |
| 2015/0142386 | A1 * | 5/2015 | Vaucher | B60W 50/0225 702/183 |
| 2017/0024868 | A1 * | 1/2017 | Bock | H04N 5/363 |
| 2017/0199277 | A1 * | 7/2017 | Villeneuve | G01S 7/4804 |
| 2018/0069367 | A1 * | 3/2018 | Villeneuve | G01S 17/02 |
| 2018/0120433 | A1 * | 5/2018 | Eichenholz | G01S 17/06 |

FOREIGN PATENT DOCUMENTS

| | | |
|---|---|---|
| CN | 103124092 A | 5/2013 |
| JP | 2005-261180 A | 9/2005 |
| JP | 2013-244800 A | 12/2013 |

OTHER PUBLICATIONS

A Diverse Low Cost High Performance Platform for Advanced Driver Assistance System (ADAS) ApplicationsPrashanth Viswanath et al., 2016 IEEE Conf. on Computer Vision and Patern Recognition Workshops (CVPRW); Year 2016, pp. 819-827. (Year: 2016) (Year: 2016) (Year: 2016) (Year: 2016) (Year: 2016).*

Clustering of high resolution automotive radar detections and subsequent feature extraction for classification of road users; Eugen Schubert et al., 2015 16th International Radar Symposium (IRS); Year: 2015; pp. 174-179. (Year: 2015) (Year: 2015) (Year: 2015) (Year: 2015) (Year: 2015) (Year: 2015) (Year: 2015).*

Vehicle recognition based on radar and vision sensor fusion for automatic emergency braking; Heong-tae Kim et al.; 2013 13th International Conference on Control, Automation and Systems (ICCAS 2013); Year: 2013; pp. 1342-1346. (Year: 2013) (Year: 2013) (Year: 2013) (Year: 2013) (Year: 2013) (Year: 2013).*

Active Pedestrian Safety by Automatic Braking and Evasive Steering; Christoph G. Keller et al., IEEE Transactions on Intelligent Transportation Systems; Year: 2011, vol. 12, Issue: 4; pp. 1292-1304. (Year: 2011) (Year: 2011) (Year: 2011) (Year: 2011) (Year: 2011) (Year: 2011) (Year: 2011) (Year: 2011).*

International Search Report issued in PCT/JP2015/002795; dated Jul. 14, 2015.

* cited by examiner

AUTOMATIC BRAKE DEVICE

TECHNICAL FIELD

The present disclosure relates to an automatic brake device of a vehicle, and particularly to an automatic brake device that actuates a brake of a travelling vehicle in a case where the vehicle will potentially collide with a forward obstacle.

BACKGROUND ART

When a driver looks aside or sleeps to fail to confirm a forward obstacle while driving, the vehicle might collide with the obstacle. To avoid such dangerous situations, developed is an automatic brake device that uses a vehicle-mounted radar or a camera to monitor an obstacle forward of the vehicle, and in a case where the travelling vehicle will potentially collide with the forward obstacle, actuates a brake of the vehicle.

In such an automatic brake device as described above, if the brake is actuated at an unnecessarily early timing after detection of an obstacle or the like, for example, a driver might erroneously recognize that the automatic brake device malfunctions. On the other hand, if the brake is actuated with a delay, the vehicle will potentially collide with the obstacle.

Thus, to start actuation of the brake at an appropriate timing after detection of an obstacle or the like, urgent braking by the automatic brake device is required to have further enhanced brake performance of automatic braking.

In a known technique, a booster circuit boosts electric power of a battery so that a charging circuit is charged with the boosted electric power, and the electric power of the charging circuit is supplied to an electric motor when necessary. In this manner, even in a case where a necessary motor output rapidly increases, such as the case of urgent avoidance or urgent braking, high responsiveness can be obtained (see, for example, Patent Document 1).

CITATION LIST

Patent Document

PATENT DOCUMENT 1: Japanese Patent Publication No. 2005-261180

SUMMARY OF THE INVENTION

Technical Problem

In a technique described in Patent Document 1, for example, unless the charging circuit is sufficiently charged, a high voltage might fail to be supplied to the electric motor. In view of the foregoing problems, the present disclosure provides an automatic brake device that can enhance brake performance in urgent braking.

Solution to Problem

An automatic brake device according to an aspect of the present disclosure is an automatic brake device that actuates a brake of a travelling vehicle in a case where the travelling vehicle will potentially collide with an obstacle forward of the vehicle, and the automatic brake device includes: a first electric power storage connected to a power supply line; a fluid transfer unit that is driven by receiving electric power through the power supply line and applies a braking fluid pressure to the brake; an electric power generator that receives power from an engine of the vehicle and generates electric power at a voltage higher than a charged voltage of the first electric power storage; a second electric power storage that stores the electric power generated by the electric power generator; and a voltage converter that converts the charged voltage of the second electric power storage to a predetermined value and supplies the converted voltage to the power supply line, wherein in a case where the vehicle will potentially collide with a forward obstacle, an output voltage of the voltage converter is set at a target voltage higher than an output voltage in a normal state before actuation of the brake, or if the output voltage of the voltage converter cannot be set at the target voltage, the electric power generator is driven to connect a generation voltage of the electric power generator to the power supply line.

With this configuration, in a case where the travelling vehicle will potentially collide with a forward obstacle, if the charged voltage of the second electric power storage is sufficient, the second electric power storage is used, whereas if the charged voltage of the second electric power storage is insufficient, the electric power generator is driven to increase a power supply voltage of the automatic brake device so that a braking fluid pressure can be enhanced.

In the automatic brake device, in a case where the vehicle will not potentially collide with an obstacle, if the charged voltage of the second electric power storage is low to such an extent that the output voltage of the voltage converter cannot be set at the target voltage, the electric power generator may be driven to charge the second electric power storage.

With this configuration, the second electric power storage can always be used to increase the power supply voltage of the automatic brake device so that the voltage of the power supply line can be more quickly increased to the target voltage.

The automatic brake device may further include a switch that switches a connection state of the electric power generator and the second electric power storage between connection and disconnection, wherein when the generation voltage of the electric power generator may be connected to the power supply line, the switch is turned off.

With this configuration, all the electric power voltage generated by the electric power generator can be supplied to the power supply line so that the voltage of the power supply line can be more quickly increased to the target voltage.

Advantages of the Invention

According to the present disclosure, a vehicle can be urgently braked with high brake performance at a timing when automatic braking is needed, independently of a charging state of an electric power storage. Thus, it is possible to avoid collision of a travelling vehicle with a forward obstacle.

DESCRIPTION OF EMBODIMENTS

An embodiment of the present disclosure will be described hereinafter with reference to the drawings. The present disclosure is not limited to the following embodiment.

Figure 1:
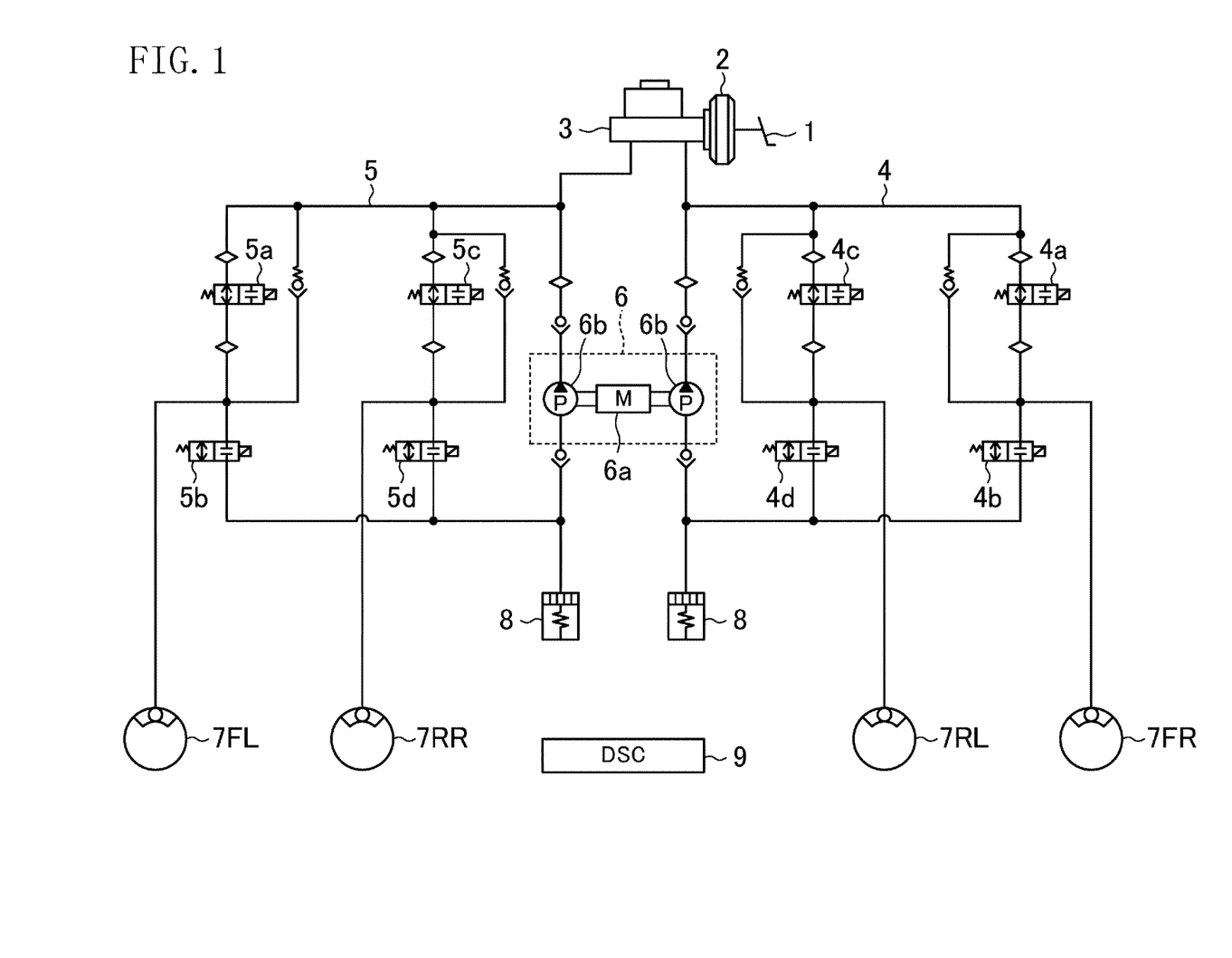
FIG. 1 is a hydraulic circuit diagram of an automatic brake device according to an embodiment of the present disclosure.

First, a hydraulic circuit of an automatic brake device according to an embodiment of the present disclosure will be described. FIG. 1 is a hydraulic circuit diagram of the automatic brake device according to the embodiment of the present disclosure. The automatic brake device of this embodiment constitutes a dynamic stability control (DSC) system.

When a driver presses a brake pedal 1, a brake booster 2 increases a tread power of the brake pedal 1 by using a depression at an unillustrated engine manifold, compressed air, or a hydraulic pressure, for example. In this manner, a tread force necessary for the driver to press the brake pedal 1 can be reduced. A master cylinder 3 generates a braking fluid pressure in accordance with the tread power increased by the brake booster 2. The braking fluid pressure generated by the master cylinder 3 is supplied to a fluid pressure unit 6 through two fluid pressure supply lines 4 and 5. The braking fluid pressure is distributed to four wheels, that is, front right, front left, rear right, and rear left wheels, of the vehicle by the fluid pressure unit 6 to be supplied to a brake device 7FR of the front right wheel, a brake device 7FL of the front left wheel, a brake device 7RR of the rear right wheel, and a brake device 7RL of the rear left wheel.

The fluid pressure unit 6 includes a motor 6a and a fluid pressure pump 6b. The fluid pressure pump 6b is driven by the motor 6a, and holds a braking fluid pressure in the fluid pressure supply lines 4 and 5 at a predetermined pressure.

The fluid pressure supply line 4 is branched from the fluid pressure unit 6 into two parts corresponding to the front wheels and the rear wheels, and these two parts are respectively connected to a caliper piston of the brake device 7FR of the front right wheel and a wheel cylinder of the brake device 7RL of the rear left wheel. On the other hand, the fluid pressure supply line 5 is branched from the fluid pressure unit 6 into two parts corresponding to the front wheels and the rear wheels, and these two parts are respectively connected to a caliper piston of the brake device 7FL of the front left wheel and a wheel cylinder of the brake device 7RR of the rear right wheel. In this manner, the braking fluid pressure pipes constitute a so-called cross type two-system pipes.

The fluid pressure supply line 4 drives the caliper piston of the brake device 7FR of the front right wheel through a booster solenoid valve 4a for boosting a braking fluid pressure in the line and a decompression solenoid valve 4b for decompressing the braking fluid pressure, and drives the wheel cylinder of the brake device 7RL of the rear left wheel through a booster solenoid valve 4c and a decompression solenoid valve 4d for decompression.

The fluid pressure supply line 5 drives the caliper piston of the brake device 7FL of the front left wheel through a booster solenoid valve 5a for boosting a braking fluid pressure in the line and a decompression solenoid valve 5b for decompressing the braking fluid pressure, and drives the wheel cylinder of the brake device 7RR of the rear right wheel through a booster solenoid valve 5c and a decompression solenoid valve 5d for decompression.

Each of the booster solenoid valves 4a, 4c, 5a, and 5c and the decompression solenoid valves 4b, 4d, 5b, and 5d is a normally closed solenoid valve having two ports and two positions. Each of these solenoid valves is switched between an open state and a closed state in response to a signal from a DSC controller 9 and adjusts a braking fluid pressure applied from the master cylinder 3 to the caliper pistons and the wheel cylinders of the brake devices 7FR, 7FL, 7RR, and 7RL.

The fluid pressure supply lines 4 and 5 are provided with reservoirs 8. The reservoirs 8 temporarily store brake fluid from the caliper pistons for smooth decompression in reducing the braking fluid pressure.

While the DSC controller 9 outputs no control signal, a braking fluid pressure generated in the master cylinder 3 in accordance with a pressing operation of the brake pedal 1 by a driver is applied to the caliper pistons and the wheel cylinders through the booster solenoid valves 4a, 4c, 5a, and 5c in the open states so that a braking force is applied to each wheel. In response to an input of a control signal from the DSC controller 9, the booster solenoid valves 4a, 4c, 5a, and 5c and the decompression solenoid valves 4b, 4d, 5b, and 5d are opened or closed independently of each other so that the pressures of the caliper pistons of the brake devices 7FR and 7FL and the pressures of the wheel cylinders of the brake devices 7RR and 7RL are increased or reduced, and thereby, a braking force applied to each wheel is controlled.

The DSC controller 9 includes, for example, a central processing unit (CPU), a read only memory (ROM), a random access memory (RAM), and an interface circuit, and outputs control signals to the booster solenoid valves 4a, 4c, 5a, and 5c and the decompression solenoid valves 4b, 4d, 5b, and 5d to perform anti-lock brake system (ABS) control and control of suppression of side slip of the vehicle, based on a wheel speed, a shift range, a braking fluid pressure, an engine revolution speed, and other parameters as detection signals from sensors.

Figure 2:
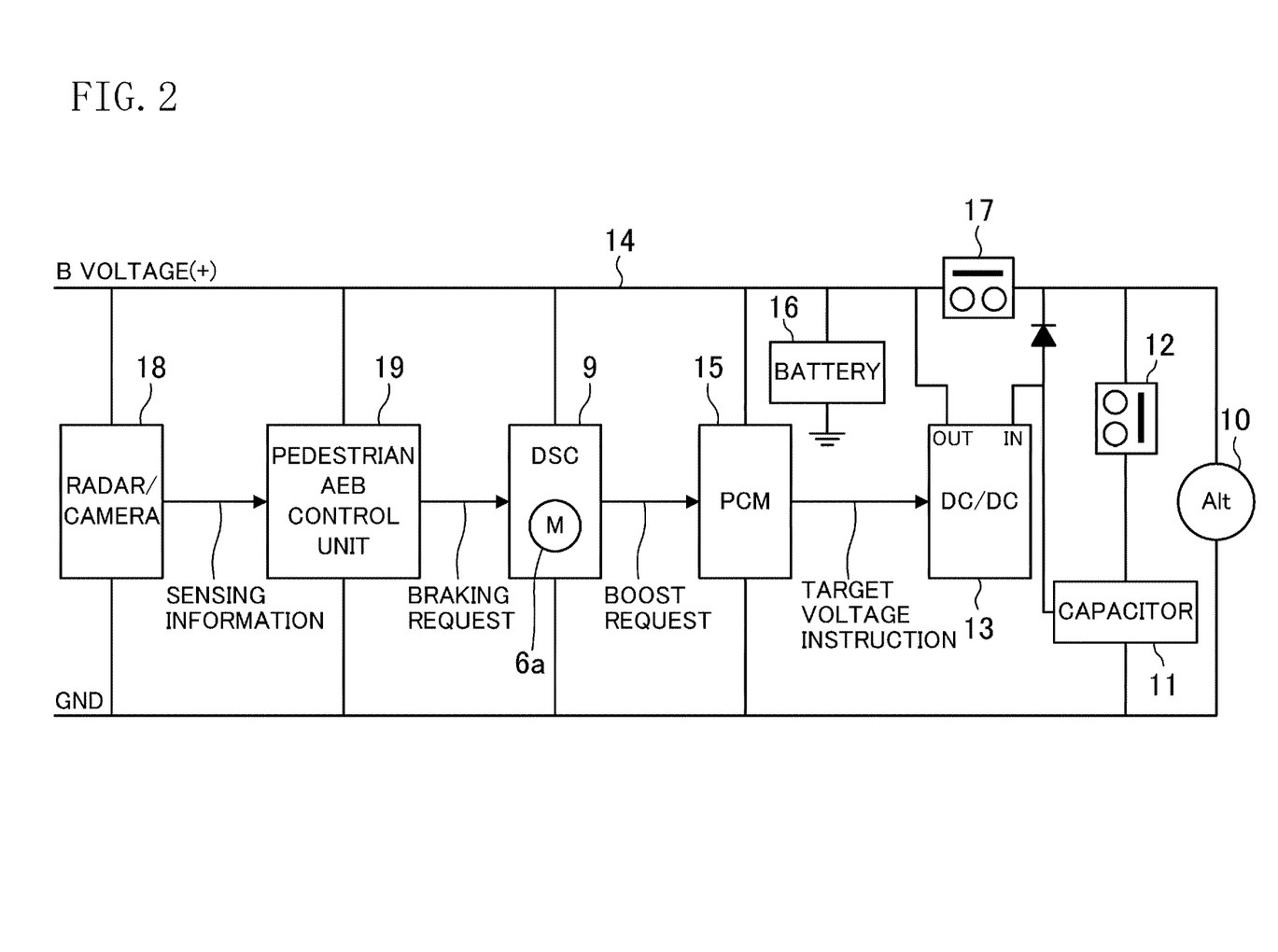
FIG. 2 is an electric system diagram of the automatic brake device according to the embodiment of the present disclosure.

Next, an electric system of the automatic brake device according to the embodiment of the present disclosure will be described. FIG. 2 is an electric system diagram of the automatic brake device according to the embodiment of the present disclosure. The automatic brake device according to this embodiment constitutes an autonomous emergency braking (AEB) system and a decelerating energy regeneration system.

When a vehicle travels forward without pressing an accelerator, such as travelling on a downslope or during deceleration of the vehicle, an alternator 10 receives rotative power from axles and generates electric power. The alternator 10 can also generate electric power by receiving power from an engine of the vehicle. A capacitor 11 stores electric power generated by the alternator 10. The alternator 10 and the capacitor 11 are connected to each other through a cutout relay 12. When the cutout relay 12 is on, the alternator 10 and the capacitor 11 are connected to each other so that electric power generated by the alternator 10 is stored in the capacitor 11.

A DC/DC converter 13 converts a charged voltage of the capacitor 11 to a predetermined value and supplies the converted voltage to the power supply line 14. A powertrain control module (PCM) 15 is an electronic module for controlling a powertrain of the vehicle. The PCM 15 has the function of instructing an output voltage to the DC/DC converter 13. A battery 16 is a power supply for supplying electric power to electric components of the vehicle, and is connected to the power supply line 14 to charge or discharge the power supply line 14. The battery 16 has a charged voltage of approximately 12 V. The electric components of the vehicle and the motor 6a in the fluid pressure unit 6 operate by receiving supply of the DC voltage through the power supply line 14.

A BP relay 17 is provided between the power supply line 14 and the alternator 10. In a normal state, the BP relay 17 is off, and a voltage of electric power generated by the alternator 10 is not directly supplied to the power supply line 14. When the BP relay 17 is turned on, the alternator 10 is directly connected to the power supply line 14 so that the voltage of electric power generated by the alternator 10 can be directly supplied to the power supply line 14.

The vehicle is provided with a radar and/or a camera 18, and the radar and/or the camera 18 is used for detecting an obstacle forward of the vehicle and for measuring a distance to the obstacle. A pedestrian AEB control unit 19 determines whether a travelling vehicle will potentially collide with an obstacle or not based on, for example, sensing information acquired from the radar and/or the camera 18 and a current travelling velocity of the vehicle. If it is determined that the vehicle will potentially collide with the obstacle, actuation of a brake is requested for the DSC controller 9. When receiving the braking request, the DSC controller 9 drives the motor 6a to increase the braking fluid pressure. In this manner, the vehicle is stopped by urgent braking so that collision of the obstacle can be avoided.

More specifically, prior to an issue of a request for actuating the brake, the pedestrian AEB control unit 19 issues an alarm that notifies the DSC controller 9 of a risk of collision with an obstacle. In response to the alarm about a collision risk, the DSC controller 9 requests the PCM 15 of a boost. In response to the request for a boost, the PCM 15 sets an output voltage of the DC/DC converter 13 at a target voltage (e.g., 15 V) higher than that in a normal state, and a high voltage is supplied from the DC/DC converter 13 to the power supply line 14. In this manner, when the DSC controller 9 receives a braking request, the motor 6a is driven at a voltage relatively higher than that in a normal state so that brake performance in urgent braking is enhanced.

Figure 3:
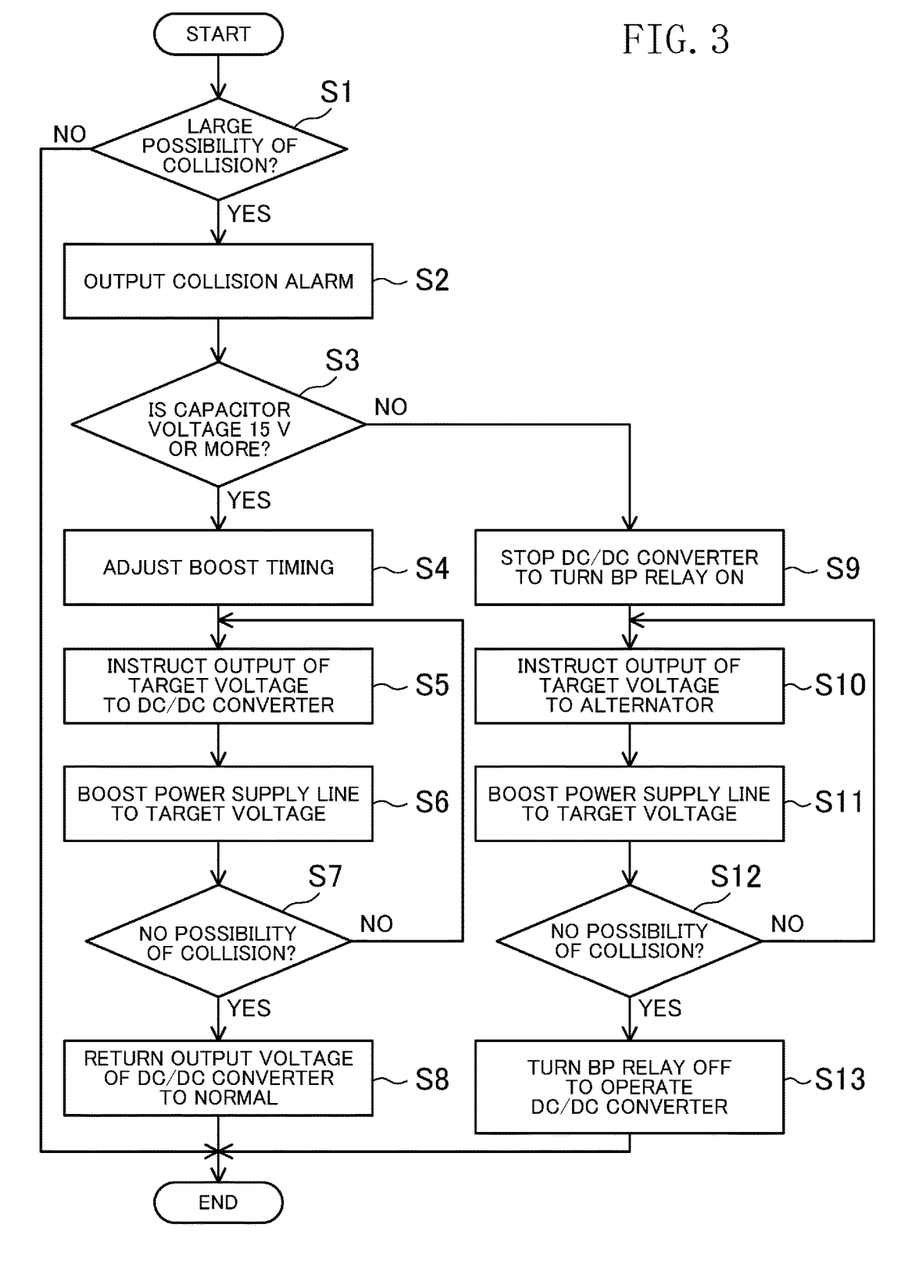
FIG. 3 is a flowchart of boost control by the automatic brake device according to the embodiment of the present disclosure.
Figure 4:
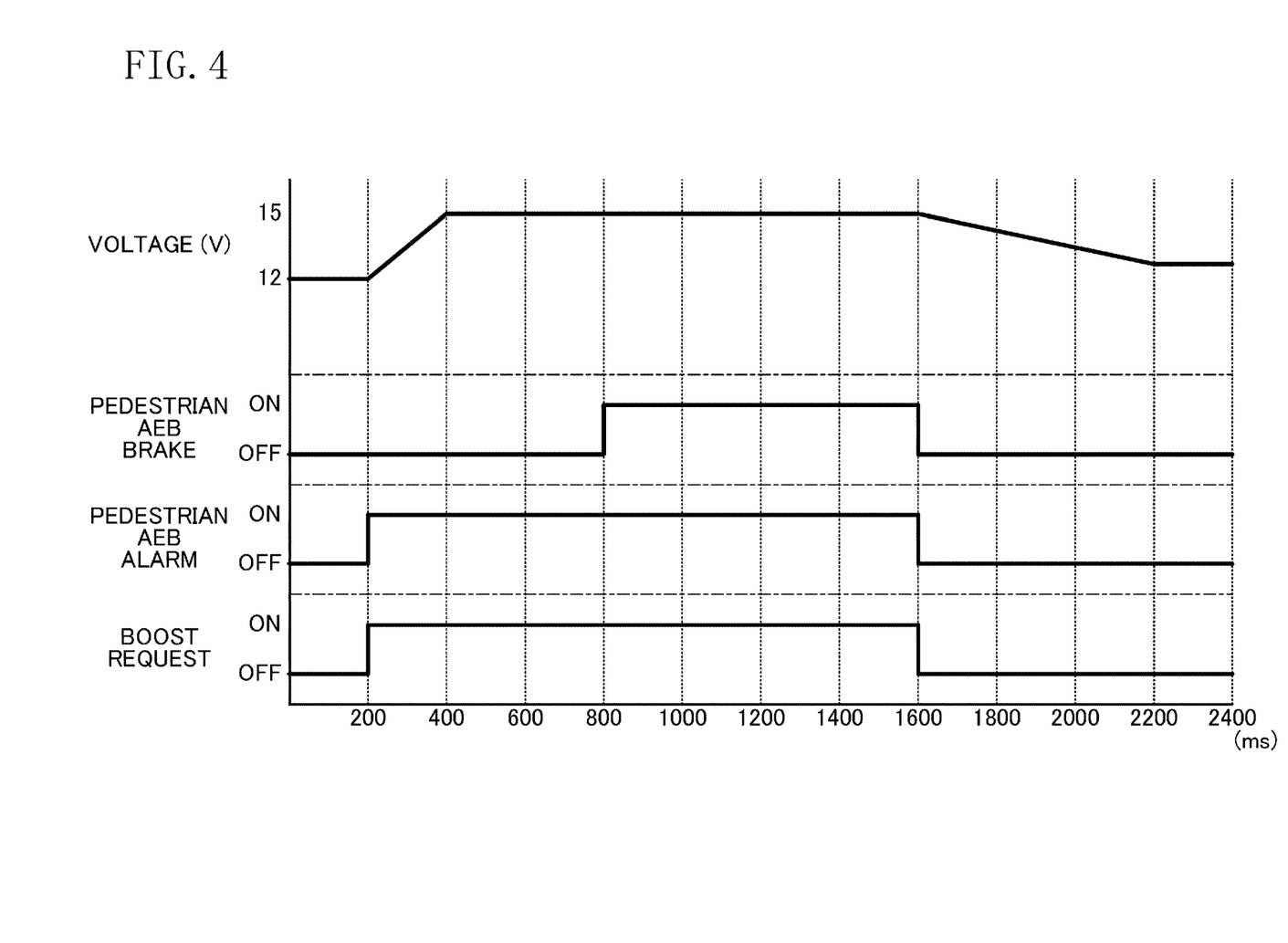
FIG. 4 is a timing chart of a case where a power supply voltage of the automatic brake device is increased by using a capacitor.
Figure 5:
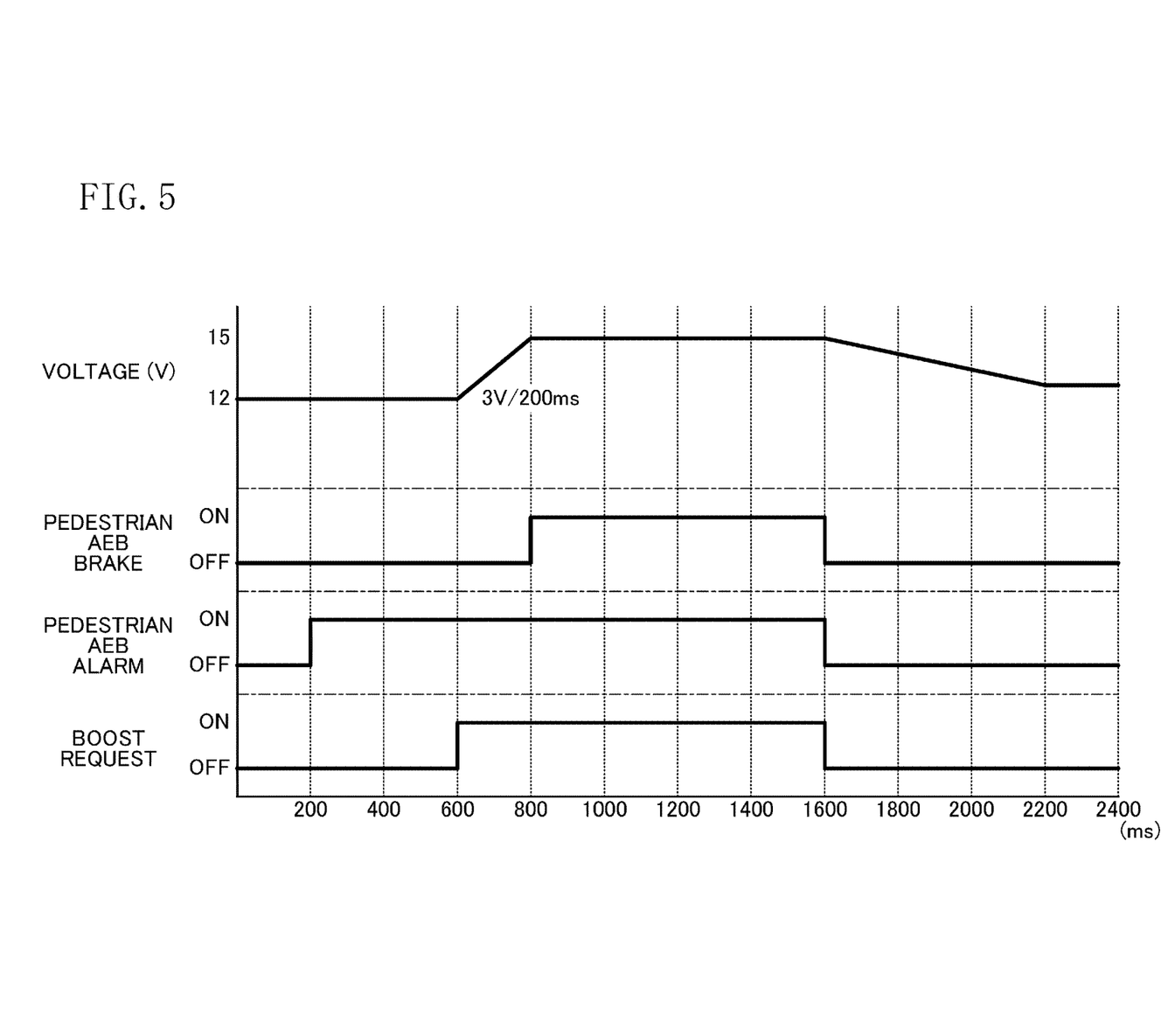
FIG. 5 is a timing chart of a case where the power supply voltage of the automatic brake device is increased by using an alternator.

Next, a boost control by the automatic brake device according to the embodiment of the present disclosure will be described. FIG. 3 is a flowchart of boost control by the automatic brake device according to the embodiment of the present disclosure. FIG. 4 is a timing chart of a case where a power supply voltage of the automatic brake device is increased by using the capacitor 11. FIG. 5 is a timing chart of a case where the power supply voltage of the automatic brake device is increased by using the alternator 10.

The pedestrian AEB control unit 19 determines whether a travelling vehicle will potentially collide with a forward obstacle or not based on, for example, sensing information acquired from the radar and/or the camera 18 and a current travelling velocity of the vehicle (S1). If it is determined that there is a risk of collision (YES in S1), an alarm indicating collision with an obstacle is issued (S2). For example, as illustrated in FIGS. 4 and 5, a pedestrian AEB alarm is turned on.

The PCM 15 monitors a charged voltage of the capacitor 11. When an alarm notifying of a risk of collision is issued from the pedestrian AEB control unit 19, the PCM 15 determines whether the charged voltage of the capacitor 11 is greater than or equal to a predetermined value (e.g., 15 V) or not (S3). If the charged voltage of the capacitor 11 is greater than or equal to the predetermined value (YES in S3), the timing of a boost request is adjusted as necessary (S4), and an output voltage of the DC/DC converter 13 is set at a target voltage (e.g., 15 V) higher than that in a normal state (S5). In accordance with an instruction of the PCM 15, the DC/DC converter 13 starts outputting a high voltage, and a voltage of the power supply line 14 is increased to the target voltage (S6).

In FIG. 4, immediately after the pedestrian AEB alarm is turned on, a boost request is issued, and the voltage of the power supply line 14 is increased. In this manner, as long as the capacitor 11 has a sufficient charged voltage, the use of the capacitor 11 can quickly increase the voltage of the power supply line 14 to the target voltage.

The pedestrian AEB control unit 19 continues determining whether the travelling vehicle will potentially collide with an obstacle or not. If there is a risk of collision (NO in S7), steps S5 to S7 are repeated. While steps S5 to S7 are repeated, when the pedestrian AEB control unit 19 issues a request for actuating the brake, the motor 6a is driven at an increased power supply voltage so that the vehicle can be urgently braked with high braking performance. In FIG. 4, in a period in which the voltage of the power supply line 14 is increased, a request for actuating a pedestrian AEB brake is output so that the vehicle is urgently braked.

In step S7, if the pedestrian AEB control unit 19 determines that the travelling vehicle will not potentially collide with an obstacle any more (YES in S7), the PCM 15 issues an instruction of returning an output voltage to a normal value (e.g., 12 V) to the DC/DC converter 13 (S8). In this manner, the power supply line 14 returns to a normal voltage (e.g., 12 V).

On the other hand, if the charged voltage of the capacitor 11 does not reach a predetermined value in step S3 (NO in S3), the charged voltage of the capacitor 11 cannot increase the voltage of the power supply line 14 to the target voltage. Thus, the PCM 15 stops the DC/DC converter 13, controls the cutout relay 12 off and the BP relay 17 on, and directly connects a voltage of electric power generated in the alternator 10 to the power supply line 14 (S9). Thereafter, the PCM 15 instructs that the alternator 10 generates electric power at a target voltage (e.g., 15 V) higher than that in a normal state (S10). The alternator 10 starts generating power at a high voltage in accordance with an instruction of the PCM 15, and the voltage of the power supply line 14 is increased to the target voltage (S11).

In FIG. 5, after a lapse of time since the pedestrian AEB alarm has been turned on, a boost request is issued, and the voltage of the power supply line 14 is increased. In this manner, even if the charged voltage of the capacitor 11 is insufficient, the voltage of the power supply line 14 can be increased by driving the alternator 10. It should be noted that as compared the case of using the capacitor 11, the case of using the alternator 10 takes time to increase the voltage of the power supply line 14 to a target voltage.

The pedestrian AEB control unit 19 continues determining whether the travelling vehicle will potentially collide with an obstacle or not. While there is a risk of collision (NO in S12), steps S10 to S12 are repeated. While steps S10 to S12 are repeated, when the pedestrian AEB control unit 19 issues a request for actuating the brake, the motor 6a is driven at an increased power supply voltage so that the vehicle can be urgently braked with high braking performance. In FIG. 5, in a period in which the voltage of the power supply line 14 is increased, a request for actuating the pedestrian AEB brake is output so that the vehicle is urgently braked.

In step S12, if the pedestrian AEB control unit 19 determines that the travelling vehicle will not potentially collide with an obstacle any more (YES in S12), the PCM 15 controls the BP relay 17 off so that the DC/DC converter 13 operates (S13). In this manner, the power supply line 14 returns to a normal voltage (e.g., 12 V). In step S13, the alternator 10 may be stopped or may continue to be driven. In the case where the alternator 10 continues to be driven, the cutout relay 12 is controlled to be on so that the voltage of electric power generated by the alternator 10 is stored in the capacitor 11.

As described above, according to this embodiment, in a case where a travelling vehicle will potentially collide with a forward obstacle, if the charged voltage of the capacitor 11 is sufficient, the capacitor 11 is used, and if the charged voltage of the capacitor 11 is insufficient, the alternator 10 is driven so that a power supply voltage of the automatic brake device is increased to increase a braking fluid pressure. In this manner, independently of a charging state of the capacitor 11, the vehicle can be urgently braked with high braking performance at a time when automatic braking is necessary, thereby avoiding collision with an obstacle.

In a case where a vehicle will not potentially collide with an obstacle, to enable an increase of the power supply voltage of the automatic brake device by always using the capacitor 11, the alternator 10 may be driven to charge the capacitor 11 when the charged voltage of the capacitor 11 is low to such an extent that the output voltage of the DC/DC converter 13 cannot be set at a target voltage.

The foregoing embodiment is an example of implementation of the present disclosure, and the present disclosure is applicable to embodiments obtained by changing or modifying the above embodiment without departing from the gist of the present disclosure.

DESCRIPTION OF REFERENCE CHARACTERS

6 fluid pressure unit (fluid transfer unit)
10 alternator (electric power generator)
11 capacitor (second electric power storage)
12 cutout relay (switch)
13 DC/DC converter (voltage converter)
16 battery (first electric power storage)

The invention claimed is:

1. An automatic brake device that actuates a brake of a travelling vehicle in a case where the travelling vehicle will potentially collide with an obstacle forward of the vehicle, the automatic brake device comprising:
a brake device provided at a wheel of the vehicle,
a first electric power storage connected to a power supply line;
a fluid transfer unit that is driven by receiving electric power through the power supply line and applies a braking fluid pressure to the brake device;
an electric power generator that receives power from an engine of the vehicle and generates electric power at a voltage higher than a charged voltage of the first electric power storage;
a second electric power storage that stores the electric power generated by the electric power generator;
a voltage converter that converts the charged voltage of the second electric power storage to a predetermined value and supplies the converted voltage to the power supply line,
a control unit that determines whether the travelling vehicle will potentially collide with an obstacle or not; and
a controller that drives the fluid transfer unit when the control unit determines that the travelling vehicle will potentially collide with an obstacle, wherein
in a case where the vehicle will potentially collide with a forward obstacle, an output voltage of the voltage converter is set at a target voltage higher than an output voltage in a normal state before actuation of the brake device, and if the output voltage of the voltage converter cannot be set at the target voltage, the electric power generator is driven to connect a generation voltage of the electric power generator to the power supply line.

2. The automatic brake device of claim 1, wherein
in a case where the vehicle will not potentially collide with an obstacle, if the charged voltage of the second electric power storage is low to such an extent that the output voltage of the voltage converter cannot be set at the target voltage, the electric power generator is driven to charge the second electric power storage.

3. The automatic brake device of claim 1, further comprising
a switch that switches a connection state of the electric power generator and the second electric power storage between connection and disconnection, wherein
when the generation voltage of the electric power generator is connected to the power supply line, the switch is turned off.

4. The automatic brake device of claim 2, further comprising
a switch that switches a connection state of the electric power generator and the second electric power storage between connection and disconnection, wherein
when the generation voltage of the electric power generator is connected to the power supply line, the switch is turned off.

* * * * *